US006678819B1

United States Patent
Bouyoux

(10) Patent No.: US 6,678,819 B1
(45) Date of Patent: Jan. 13, 2004

(54) PIPELINE MICROPROCESSOR WITH CONDITIONAL JUMP IN ONE CLOCK CYCLE

(75) Inventor: Eric Bouyoux, Bouc Bel Air (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/564,477

(22) Filed: May 3, 2000

Related U.S. Application Data

(63) Continuation of application No. PCT/FR98/02265, filed on Oct. 23, 1998.

(30) Foreign Application Priority Data

Nov. 3, 1997 (FR) .......................................... 97 13757

(51) Int. Cl.[7] .............................................. G06F 9/38
(52) U.S. Cl. ...................................... 712/219; 712/233
(58) Field of Search ................................ 712/219, 233

(56) References Cited

U.S. PATENT DOCUMENTS 4,943,915 A * 7/1990 Wilhelm et al. .............. 712/34
4,974,155 A * 11/1990 Dulong et al. .............. 712/219
5,136,696 A * 8/1992 Beckwith et al. ........... 712/240
5,148,529 A * 9/1992 Ueda et al. ................. 712/218

* cited by examiner

Primary Examiner—Richard L. Ellis
(74) Attorney, Agent, or Firm—Akin Gump Strauss Hauer & Feld, L.L.P.

(57) ABSTRACT

The present invention relates to a pipeline microprocessor (MP1, MP2) comprising a program counter (PC), means (MUX, ADD) for the incrementation of the program counter (PC), instruction decoding means (PREDEC, DEC1, DEC2, DEC3) comprising means (PREDEC) to decode a conditional jump instruction (JMPc) of the program counter, a bank of registers (REGBANK), a computation unit (ALU) comprising a first output (S1) to deliver a result and a second output (S2) to deliver status bits (C, N, P, Z) of the result. According to the invention, the computation unit (ALU) and the means (PREDEC, DEC3) for decoding the conditional jump instruction (JMPc) are laid out in two neighboring pipeline stages (ST1, ST2), and the means (PREDEC) for decoding the conditional jump instruction (JMPc) are connected to the second output (S2) of the computation unit (ALU).

8 Claims, 2 Drawing Sheets

PIPELINE MICROPROCESSOR WITH CONDITIONAL JUMP IN ONE CLOCK CYCLE

CROSS REFERENCE TO RELATED APPLICATION

This Application is a continuation of International Application PCT/FR98/02265 filed Oct. 23, 1998, the disclosure of which is incorporated herein by reference.

BACKGROUND OF THE INVENTION

The present invention relates to a pipeline microprocessor comprising a program counter, a circuit for the incrementation of the program counter, means to decode a set of instructions of the microprocessor comprising means to decode a conditional jump instruction of the program counter and a computation unit comprising a first output to deliver a result and a second output to deliver status bits of the result.

The present invention also relates to the execution of a conditional jump instruction in a pipeline microprocessor of the above type.

The term "conditional jump instruction" refers in the present application to a jump instruction JMPc from the program counter PC of a microprocessor whose execution depends on the result of a previous instruction. For example, the following instructions are conditional jumps:
1) JMPc IF C=0 VAL (jump with a value VAL if C=0),
2) JMPc IF N=0 VAL (jump with a value VAL if N=0),
3) JMPc IF P=0 VAL (jump with a value VAL if P=0),
4) JMPc IF Z=0 VAL (jump with a value VAL if Z=0),
the bit C ("carry") being the sum carry bit (or overflow bit), the bit N being the sign bit, the bit P being the parity bit and the bit Z being the zero value bit of the result of an operation performed by an arithmetic and logic computation unit ALU. These bits C, N, P, Z or flags are conventionally stored in a register called Rf ("flags register").

In the prior art, a conditional jump instruction cannot be executed before the result of the previous instruction is known and before the register Rf containing the flags is updated. This necessity contradicts the fact that, in a pipeline microprocessor, the steps of processing two successive instructions overlap one another with a shift of one rank. By way of example, we shall consider the following program sequence:
(1) ($ADR_1$) SUB R1,R2,R3
(2) ($ADR_2$) JMPC IF Z=1 VAL,
which means:
(1) "subtract the contents of a register R3 from the contents of a register R2 and record the result in a register R3",
(2) "jump program to address $ADR_2$+VAL if the result is zero, else go to immediately following address $ADR_3$ of the program",
and implies the processing steps described here below, each step being performed in one clock cycle:
  1.1—reading of the instruction SUB at the address $ADR_1$ of the program memory of the microprocessor, and incrementation of the program counter PC ($ADR_1$ becomes $ADR_2$),
  1.2—decoding of the instruction SUB,
  1.3—reading of the registers R2 and R3,
  1.4—subtraction by the unit ALU of the contents of the register R3 from the contents of the register R2,
  1.5—recording of the result of the subtraction in the register R1 and recording in the register Rf of the flags C, N, P, Z delivered by the unit ALU,
  2.1—reading of the instruction JMPc at the address $ADR_2$ and normal incrementation of the program counter ($ADR_2$ becomes $ADR_3$),
  2.2—decoding of the instruction JMPc,
  2.3—reading of the flag z in the register Rf; if Z=1, computation of the address $ADR_2$+VAL and loading of this address in the program counter PC.

In a pipeline processing chain, the steps 1.x and 2.x here above should be processed simultaneously with a one-rank shift. However, it can be seen that the step 2.3 cannot overlap the step 1.4 because the result of the previous operation is not yet available in the register Rf. Also, a new instruction following the instruction JMPc cannot be read before the step 2.3 of the instruction JMPc has ended because it is not yet known at what address this instruction has to be read.

Thus, the standard approach to overcome this drawback consists in suspending the injection of a new instruction into the pipeline chain until the flags C, N, P, Z are loaded into the register Rf (step 1.5) and the conditional jump instruction is processed (step 2.3).

This method has the drawback of temporarily blocking the working of the pipeline chain and slowing down the performance of a program. Generally, the time lost for the execution of a program is proportional to the number of conditional jumps that the program contains.

The main goal of the present invention is to provide for a pipeline microprocessor structure for the execution of a conditional leap instruction without interruption of the pipeline processing chain.

The document U.S. Pat. No. 5,349,671, with reference to its FIGS. 1 to 4, describes a microprocessor comprising four pipeline stages, respectively for the reading of an instruction, the decoding of the instruction, the execution of the instruction and the storage of the result, as well as means for the decoding [3a, 3b] and execution [6a, 6b] of a conditional jump instruction. The decoding means [3a, 3b] are connected both to the state register [2] of the microprocessor and to the output of the computation unit ALU [4] which delivers the flags of the microprocessor. More particularly, these decoding means comprise a first circuit [3a] for the evaluation of a call address, connected to the state register [2], a second circuit [3b] for the evaluation of a call address, connected to the above-mentioned output of the unit ALU and a flag-updating detector whose output indicates whether or not the instruction being executed is capable of modifying the flags of the microprocessor. When a conditional jump instruction is decoded, the choice of the read address of the following instruction is entrusted is entrusted to the first [3a] or second [3b] evaluation circuit according to the indication given by the flag-updating detector.

SUMMARY OF THE INVENTION

The present invention seeks an alternative to this conventional pipeline microprocessor structure and is aimed especially at providing means for the decoding and processing of a conditional jump instruction that is simpler than those described here above.

A secondary goal of the present invention is to provide a pipeline microprocessor structure that is simple and consumes little current.

To attain these goals, the present invention provides for a microprocessor of the type mentioned here above in which the computation unit and the means for decoding the conditional jump instruction are laid out in two neighboring pipeline stages, and the means for decoding the conditional jump instruction are connected to the second output of the computation unit.

According to one embodiment, the microprocessor comprises a first pipeline stage and a second pipeline stage, each comprising a first sector and a second sector, the first sector of each stage being active during a first clock half-cycle and the second sector of each stage being active during a second clock half-cycle.

According to one embodiment, the means of decoding the conditional jump instruction are laid out in the first sector of the first pipeline stage and the computation unit is laid out in a first sector of the second pipeline stage.

According to one embodiment, the means for decoding the conditional jump instruction are laid out in the second sector of the first pipeline stage and the computation unit is laid out in the first sector of the second pipeline stage.

According to one embodiment, the incrementation circuit of the program counter is laid out in the second sector of the first pipeline stage.

Advantageously, the microprocessor has a bank of registers belonging in read mode to the first sector and in write mode to the second sector of the second pipeline stage. This characteristic makes it possible to simplify the structure of the microprocessor which may have only two pipeline stages, providing for greater efficiency in electrical consumption, and the execution of compact instructions comprising only one operational code, the address of a source register and the address of a destination register of the result of the operation designated by the instruction.

According to one embodiment, the sectors of the second pipeline stage are demarcated by a tristate buffer laid out between the first and second outputs of the computation unit and write inputs of the bank of registers.

According to one embodiment, the conditional jump instruction is a relative jump instruction. The means of incrementation of the program counter comprise an adder circuit receiving, at input, the current value of the program counter and the output of a multiplexer circuit, the multiplexer circuit is driven by the means for decoding the conditional jump instruction and receives, at input, a normal incrementation value of the program counter and a relative jump value of the program counter, contained in the conditional jump instruction.

According to one embodiment, the conditional jump instruction is an absolute jump instruction, the means of incrementation of the program counter comprise a multiplexer circuit receiving, at input, the output of an address circuit and an absolute jump value of the program counter contained in the conditional jump instruction, the multiplexer circuit is driven by means for decoding the conditional jump instruction, and the adder circuit receives, at input, the current value of the program counter and a normal incrementation value of the program counter.

According to one embodiment, the decoding means are laid out to decode a compact conditional jump instruction comprising an operation code, a condition and a jump value.

BRIEF DESCRIPTION OF THE SEVERAL VIEWS OF THE DRAWINGS

These characteristics and advantages of the present invention shall be explained in greater detail in the following description of two exemplary embodiments of a microprocessor according to the invention, given by way of a non-restrictive embodiment with reference to the appended figures, of which.

DETAILED DESCRIPTION OF THE INVENTION

Figure 1:
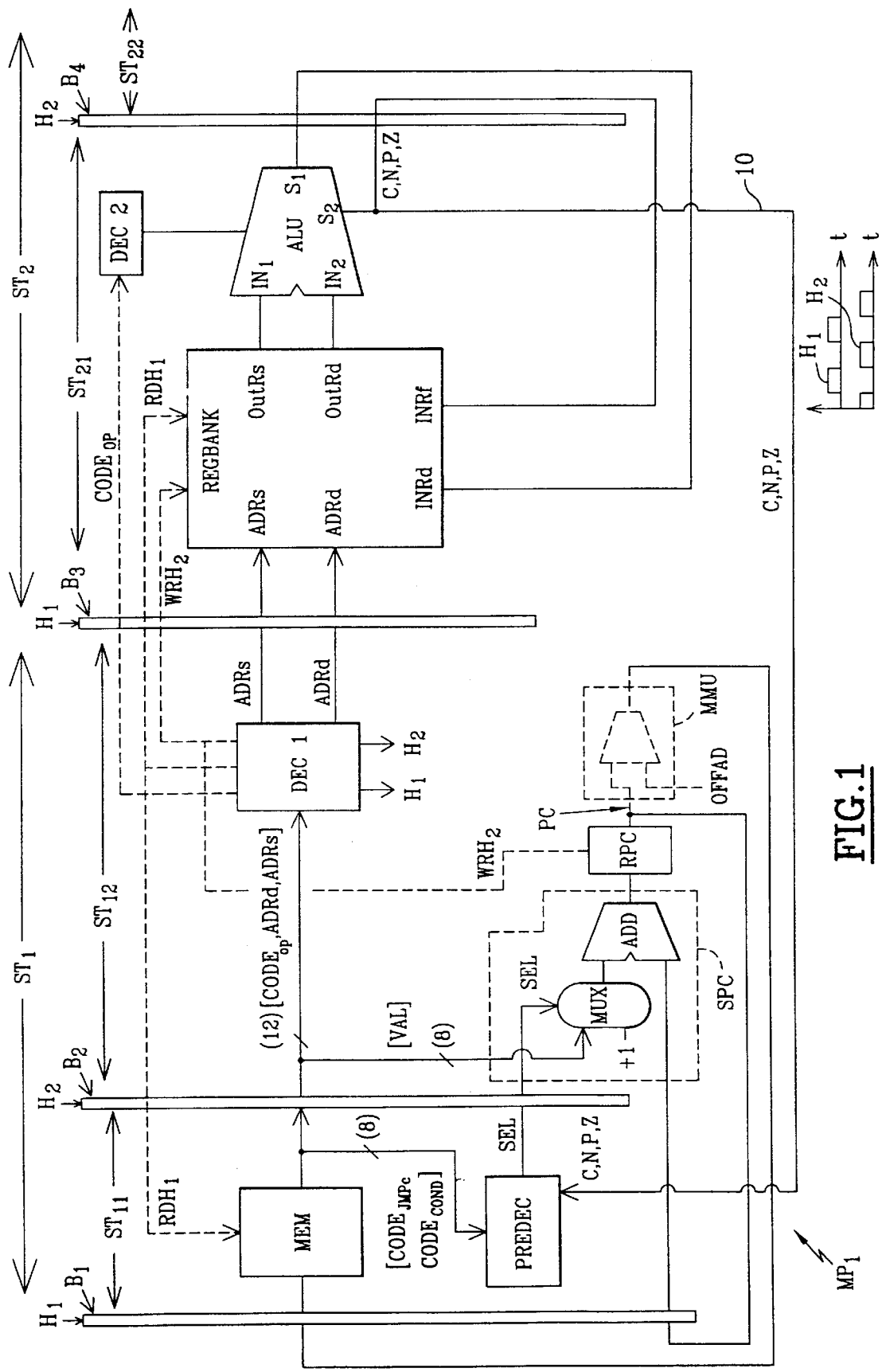
FIG. 1 is the electrical diagram of a first embodiment of a microprocessor according to the invention.

FIG. 1 shows a pipeline microprocessor MP1 according to the invention. The microprocessor is laid out to execute compact instructions that take the following format:

| $CODE_{OP}$ | ADRd | ADRs | — |
|---|---|---|---|

These instructions, encoded herein on 16 bits, comprise a code $CODE_{op}$, encoded on 4 bits, giving the operation OP to be executed, a 4-bit field ADRd giving the address of a destination register Rd of the result and a 4-bit field ADRs giving the address of a source register Rs. The last field, which is a 4-bit field, is not used here. Conventionally, the operation OP is for example the addition ADD (add Rs to Rd and store the result in Rd), the subtraction SUB (subtract Rs from Rd and store the result in Rd), the logic OR (store the result of Rs OR Rd computed bit by bit in Rd), the logic AND, etc.

The microprocessor is also laid out to execute a compact conditional jump instruction JMPc which, for example, takes the following format:

| $CODE_{JMPc}$ | $CODE_{COND}$ | VAL |
|---|---|---|

This instruction has the operation code $CODE_{JMPc}$ of the instruction, on 4 bits, the code $CODE_{COND}$ of the jump condition COND, on 4 bits, and the jump value VAL, on 8 bits. As explained in the introduction, the jump condition COND is related to the value of a status bit C, N, P, or Z and may for example be: IF Z=0, IF Z=1, IF C=0, IF C=1, etc.

Furthermore, the microprocessor comprises the following elements: a bank of registers REGBANK; an arithmetic and logic computation unit ALU; an program counter PC to give the read address, in a program memory MEM, of the instructions to be processed; a circuit SPC for the incrementation, at each new instruction received, of the program counter PC; means DEC1, DEC2, PREDEC for the decoding of a set of instructions of the microprocessor.

The unit ALU shown in block form comprises standard data-processing circuits needed for the execution of arithmetic and logic type instructions and in particular it may comprise a bit shift register. The unit ALU herein has two inputs IN1, IN2, a result output S1 and an output S2 delivering the status bits C, N, P, Z of the result.

The bank of registers REGBANK contains various working registers, for example 16 registers R1 to R16 (not shown) and hardware registers among which there is a register Rf containing the status bits C, N, P, Z. The bank REGBANK has an input ADRs to receive the address of the source register Rs, an input ADRd to receive the address of the destination register Rd, an output OUTRs to read the source register Rs, an output OUTRd to read the destination register Rd, an input INRd for writing a result in the destination register Rd and an input INRf for the writing, in the register Rf, of the status bits C, N, P, Z of a result.

The decoding means DEC1, DEC2, PREDEC comprise a main decoder DEC1, a decoder DEC2 to drive the unit ALU and a decoder PREDEC for the conditional jump instruction JMPc.

According to the invention, the data path of the microprocessor is divided into two contiguous pipeline stages ST1, ST2 demarcated by registers B1, B3. These registers B1, B3, for example latch registers, are activated by the passage to 1 of a clock signal H1. Furthermore, the two stages ST1, ST2 are each divided into two sectors, ST11/ST12, ST21/ST22, by means of a register B2 laid out between the registers B1, B3 and a register B4 placed after the register B3 in the direction of flow of the data. The register B2 is for example a latch register activated by the passage to 1 of the signal H2 phase-shifted by 180° with respect to the signal H1. The register B4 is preferably a tristate buffer that is transparent when the signal H2 is at 1 and in the high impedance state when H2 is at 0.

Thus, the clock signal H1 synchronizes the transfer of the data from the stage ST1 to the stage ST2 and the signal H2 synchronizes the transfer of the data from the first sector ST11, ST21 to the second sector ST12, ST22 of each stage ST1, ST2. To get a clear picture, the clock signal H1 and the transfer signal H2 are shown at the bottom of FIG. 1.

According to the invention, the unit ALU is laid out in the sector ST21 of the pipeline stage ST2 and the decoder PREDEC is laid out in the sector ST11 of the stage ST1. The output S2 of the unit ALU which delivers the bits C, N, P, Z is applied by means of a bus 10 to the decoder PREDEC. As shall be seen hereinafter, this connection of the decoder PREDEC to the output of the unit ALU delivering the bits C, N, P, Z enables the immediate processing of the conditional jump instruction, without waiting for the bits to be loaded into the register Rf. The decoder PREDEC receives the first eight bits of the instruction present at the output of the memory MEM. In the case of the instruction JMPc, these first eight bits comprise the operation code $CODE_{JMPc}$ and the condition code $CODE_{COND}$.

Furthermore, the outputs OUTRs and OUTRd of the bank REGBANK are applied to the inputs IN1 and IN2 of the unit ALU respectively. The outputs S1 and S2 of the unit ALU are sent back by means of the register B4 to the inputs INRd and INRf of the bank REGBANK respectively. The decoder DEC1, positioned in the sector ST12, received at least the first 12 bits of the instructions, namely the fields $CODE_{op}$, ADRd and ADRs, by means of the register B2. The addresses ADRs, ADRd are transferred to the corresponding inputs of the bank REGBANK by means of the register B3.

The bank REGBANK is controlled in read mode by a signal RDH1 and in write mode by a signal WRH2, these signals being sent by the decoder DEC1. The read signal RDH1 is sent when the clock signal H1 is at 1 and the write signal WRH2 is sent when the signal H2 is at 1. The bank REGBANK thus belongs, in read mode, to the first sector ST21 of the stage ST2 and, in write mode, to the second sector ST22 of the stage ST2. Furthermore, the decoder DEC2, laid out in the sector ST21, receives, from the decoder DEC1, the codes $CODE_{op}$ of the operations to be performed by the unit ALU.

Here, the program counter PC is made by means of a buffer register RPC that is transparent upon reception of the write signal WRH2. At each clock signal, the buffer RPC receives a new address value or address PC from the circuit SPC. After the application of the signal WRH2, the address PC is at the output of the buffer RPC and is sent to the address input of the memory MEM by means of the register B1. The memory MEM delivers, at output, the instruction contained at the address PC, upon reception of the read signal RDH1 (with a view to the consistency of FIG. 1, the memory MEM is shown in the sector ST11 although it is a peripheral element of the microprocessor). Optionally, the address PC may be applied to the memory MEM by means of a converter MMU (memory management unit) shown in dashes in the figure. The converter MMU receives an offset address OFFAD at one input and converts the address PC by the addition (as shown in the figure) or by concatenation of the address OFFAD with the address PC.

Finally, the circuit SPC has a multiplexer MUX receiving, at a first input, a normal incrementation value of the program counter, herein the value +1, and at a second input, the last eight bits of the instruction present at the output of the memory MEM, by means of the register B2. According to the format of the instructions described here above, these last eight bits correspond to the zone VAL of the instruction JMPc. The output of the multiplexer MUX is applied to an input of an adder ADD whose output is applied to the input of the buffer SPC. The address PC at the output of the buffer SPC is sent back by means of the register B1 to the second input of the adder ADD.

To illustrate the operation of the microprocessor of the invention, reference will be made for example to the following program sequence:
(1) ($ADR_1$) SUB R1,R2
(2) ($ADR_2$) JMPc IF Z=1VAL
These instructions are delivered by the memory MEM in the following form:

| $CODE_{SUB}$ | ADR1 | ADR2 | — |
|---|---|---|---|

| $CODE_{JMPc}$ | $CODE_{IF\ Z=1}$ | VAL | |
|---|---|---|---|

The sequence is executed by the microprocessor in the steps 1.1 to 2.2 described here below. The various operations performed during each step run asynchronously according to the flow of data going through the elements of the microprocessor, and are considered to be completed at the end of each step.

1.1—H1=1, H2=0, register B1 activated, sector ST11 active:
  the address PC (herein $ADR_1$) is applied to the input of the adder ADD and the memory MEM,
  the memory MEM receives the read signal RDH1 and delivers the instruction SUB R1, R2,
  the decoder PREDEC receives the code $CODE_{SUB}$ and places the signal SEL at 0 because the code $CODE_{JMPc}$ is not recognized.

1.2—H1=0, H2=1, register B2 activated, sector ST12 active:
  the decoder DEC1 receives the instruction, sends the addresses ADR1 and ADR2 to the bank REGBANK and the operation code $CODE_{SUB}$ to the decoder DEC2 (these data elements are intercepted and blocked by the register B3), the multiplexer MUX receives the signal SEL (at 0), selects the "+1" input so that the output of the adder ADD delivers the value $ADD_i+1$, giving $ADD_2$,
  the register RPC receives the write signal WRH2 and the address PC (from the ADD,) becomes $ADD_2$.

1.3—H1=1, H2=0, register B3 activated, sector ST21 active—
  the bank REGBANK receives the addresses ADR1, ADR2 and the read signal RDH1, and delivers the contents of the registers R1, R2 to the unit ALU, the unit ALU performs the subtraction, delivers the result (R1–R2) at the output Si and the bits C, N, P, Z at the output S2. The bits C, N, P, Z are applied to the decoder PREDEC through the bus 10.

1.4—H1=0, H2=1, register B4 transparent, sector ST22 active:

the outputs S1, S2 of the unit ALU are connected to the inputs INRd, INRf of the bank REGBANK. The bank receives the write signal WRH2. The result of the operation (R1–R2) is recorded in R1 and the bits C, N, P, Z present at the output S2 of the unit ALU are recorded in Rf.

2.1—H1 =1, H2 =0, register B1 activated, sector ST11 active:

the address PC (now $ADR_2$) is applied to the input of the adder ADD and of the memory MEM, the memory MEM receives the write signal RDH1 and delivers the instruction JMPc IF Z=1 VAL, the decoder PREDEC receives the code $CODE_{JMPc}$, the condition code $CODE_{IF}$ Z=1 and, through the bus 10, the bits C, N, P, Z delivered by the output S2 of the unit ALU (a floating period comes into effect, with the unit ALU performing, at the same time, the computation of the operation SUB of the step 1.3 above), the decoder PREDEC places the signal SEL at 1 if the condition Z=1 is fulfilled or places it at 0 if Z=0.

2.2—H1=0, H2=1, register B2 activated, sector ST12 active:

the field VAL (value of the address jump) is transferred to the input of the multiplexer MUX, the multiplexer MUX receives the signal SEL and selects one of its two inputs. If SEL=1, the output of the adder ADD delivers the value $ADD_n=ADD_2+VAL$; if SEL=0, the output of the adder ADD delivers the value $ADD_3=ADD_2+1$, the register RPC receives the signal WRH2 and the address PC becomes equal to $ADD_n$ or to $ADD_3$ depending on the value of the signal SEL.

In the pipeline microprocessor according to the invention, the steps described here above overlap as summarized in the table here below. It can be seen that the first step 2.1 of the instruction JMPc begins at the same instant as the step 1.3 of the instruction SUB, namely at the second pipeline cycle of this instruction. It can also be seen that the first step 3.1 for reading a new instruction following the instruction JMPc can begin after the step 2.2, the instruction JMPc having been performed and the address PC updated in a single pipeline cycle. At the end of the step 2.2, the address PC is indeed equal to $ADD_n$ or to $ADD_3$ depending on whether the jump condition has been fulfilled or not.

TABLE

| 1 pipeline cycle | | 1 pipeline cycle | | 1 pipeline cycle | |
|---|---|---|---|---|---|
| ½ cycle | ½ cycle | ½ cycle | ½ cycle | ½ cycle | ½ cycle |
| H1 = 1 | H2 = 1 | H1 = 1 | H2 = 1 | H1 = 1 | H1 = 1 |
| step 1.1 | step 1.2 | step 1.3 | step 1.4 | | |
| | | step 2.1 | step 2.2 | | |
| | | | | step 3.1 | step 3.2 |

Ultimately, and very advantageously, no interruption of the pipeline chain is needed for the processing of the instruction JMPc. Furthermore, the structure of the microprocessor according to the invention, which is particularly simple, ensures low current consumption. An additional step to limit the electrical consumption consists in placing, at the outputs OUTRs, OUTRd of the bank REGBANK, buffer registers driven by a signal H1' offset by a duration αt with respect to the signal H1. In this way, the unit ALU is connected to the outputs OUTRs, OUTRd only when they are stabilized. The offset signal H1' can be obtained simply by means of a delay circuit, for example cascade-connected inverter gates.

Figure 2:
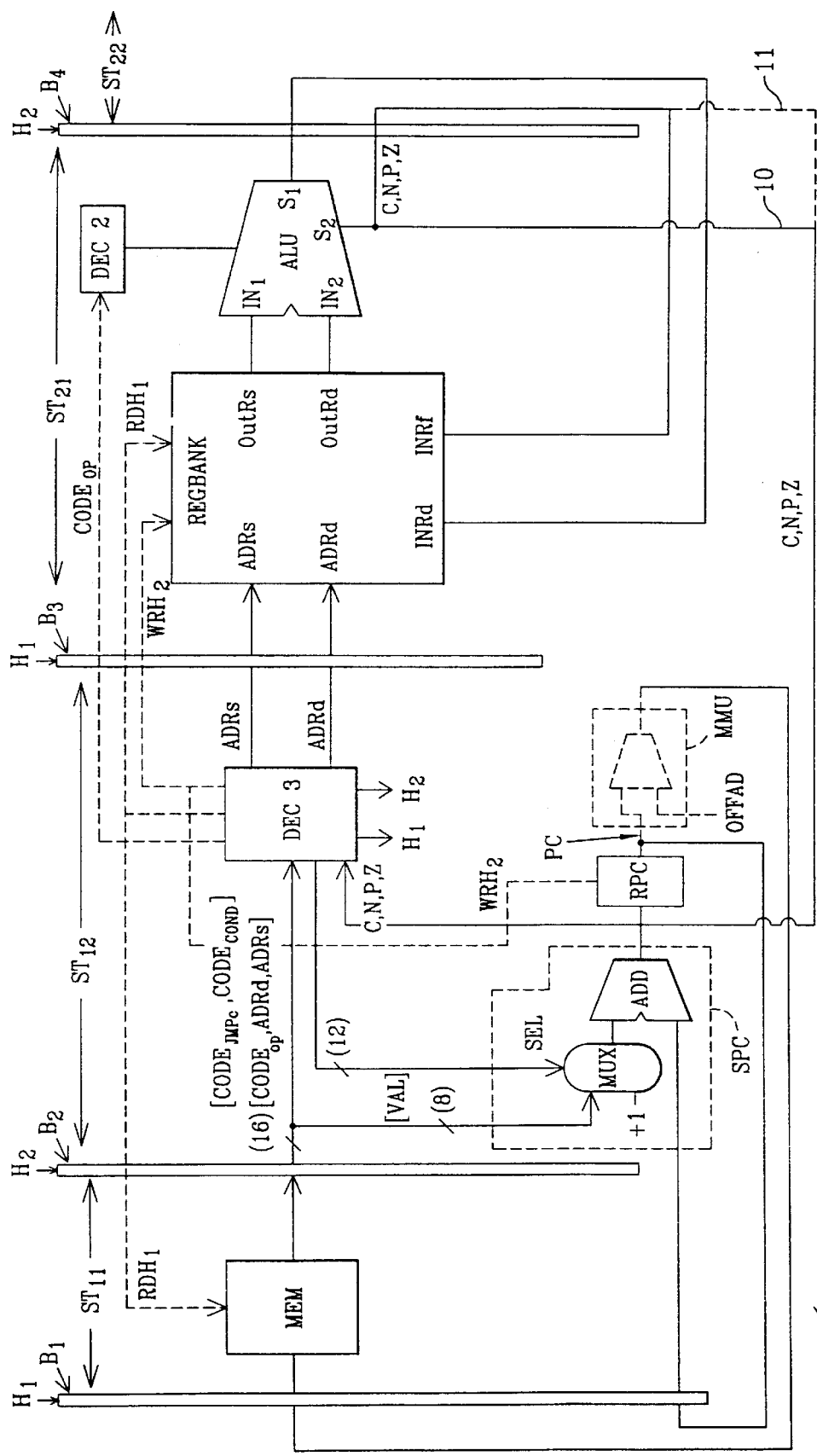
FIG. 2 shows an alternative embodiment of the microprocessor of FIG. 1.

FIG. 2 shows a variant MP2 of the microprocessor according to the invention that can be distinguished from the preceding embodiment by the fact that the decoding of the instruction JMPc is entrusted to a decoder DEC3 which is at the location of the decoder DEC1 described here above and carries out the operations of the decoders PREDEC and DEC1. The decoder DEC3 delivers especially the signal SEL during the step 2.2, with reference to the sequence described here above. It must be noted that the signal SEL can be delivered swiftly by the decoder DEC3 during the step 2.2, given that the bits C, N, P, Z are validated at the end of the step 2.1 (which corresponds to the computation step 1.3 of the previous instruction).

In this alternative embodiment, it can furthermore be seen that the bits C, N, P, Z delivered by the unit ALU may be applied to the decoder DEC2 by means of the register B4, for example by means of a bus 11 shown in dashes. Thus, when it is proposed according to the invention to connect the output S2 of the unit ALU to the decoding means of the instruction JMPc, this does not necessarily mean that the output of the unit ALU is connected directly to the decoding means. It simply means that the bits C, N, P, Z are taken at the output of the unit ALU or on the bus that conveys them to the register Rf instead of being read in the register Rf as in the prior art.

Naturally, the present invention is open to numerous other alternative embodiments and improvements. Here above we have described a simplified microprocessor that includes only the elements needed for the description and the understanding of the invention. In practice, the microprocessor of the invention could comprise various other means, for example means for decoding complex instructions, means for writing data in the memory, etc.

In particular, here above we have described a microprocessor executing a relative jump instruction by adding a value VAL to the address PC. According to one variant, an ▓ absolute jump▓ operation is performed by reversing the arrangement of the multiplexer MUX and the adder ADD (not shown). In this case, the adder ADD receives the address PC and the increment value +1 at input. The output of the adder ADD is applied to an input of the multiplexer MUX which still receives, at its other input, the jump value VAL. The output of the multiplexer MUX is applied to the register RPC. Thus, according to this variant, the address PC is incremented by the value +1 or taken to the value VAL depending on whether the signal SEL is at 1 or at 0. The value VAL, in this case, represents an absolute jump value and not a relative jump value.

Furthermore, these two embodiments of absolute condition leaps or relative conditional leaps may be juxtaposed. In this case, the arrangement shown in FIGS. 1 and 2 is kept but the second multiplexer is interposed between the adder ADD and the buffer RPC (not shown). This second multiplexer receives the output of the adder ADD and the field VAL at input. Its s applied to the register RPC and delivers PC+1, PC+VAL (relative jump) or VAL (absolute jump). Two distinct operation codes $CODE_{JMPc-rel}$ and $CODE_{JMPc-abs}$ are designed for each type of conditional jump. The decoder PREDEC (FIG. 1) or DEC3 (FIG. 2) is laid out to distinguish between each of the operations codes, and controls the multiplexer MUX and the second multiplexer as a function of the code received.

Finally, it will be clearly be seen by those skilled in the art that the working of the pipeline sectors in clock half-cycles can be obtained, in an equivalent way, by providing for a clock signal with double speed, the pipeline sectors being activated during only one in every two clock cycles, by offsetting the activation of each sector in relation to the following sector by one clock cycle. For each pipeline register B1 to B4, the selection of one out of every two clock bits as a control signal may be done simply by means of a frequency divider circuit, for example a D type flip-flop circuit whose /Q output is brought to the D input. The control signals of the pipeline registers may furthermore be combined into XOR gates before being applied, in order to ensure that two complementary sectors of one and the same pipeline stage will not be activated simultaneously.

I claim:

1. Pipeline microprocessor (MP1, MP2) comprising:
   a program counter (PC),
   means (DEC1, DEC2, DEC3) to decode a set of instructions of the microprocessor,
   means (FIG. 1 PREDEC, FIG. 2 DEC3) to decode a conditional jump instruction (JMPc) that are designed to deliver an address selection signal (SEL), laid out in a first pipeline stage (ST1) and connected to a second output (S2) of a computation unit (ALU),
   a computation unit (ALU) laid out in a second pipeline stage (ST2) neighboring the first pipeline stage (ST1), comprising a first output (S1) to deliver a result and a second output (S2) to deliver status bits (C, N, P, Z) of the result,
   a circuit (SPC) for the incrementation of the program counter (PC), comprising means (MUX, ADD) for the delivery, as a function of said address selection signal (SEL), of a read address of an immediately following instruction or a jump address determined by the contents (VAL) of a conditional jump instruction (JMPc),
   the first and second pipeline stages (ST1, ST2) each comprising a first sector (ST11, ST21) and a second sector (ST12, ST22), the first sector (ST11, ST21) of each stage (ST1, ST2) being active only during a first clock half-cycle (H1) and the second sector (ST12, ST22) of each stage (ST1. ST2) being active only during a second clock half-cycle (H2),
   the computation unit (ALU) is laid out in the first sector (ST21) of the second pipeline stage (ST2),
   the circuit (SPC) for the incrementation of the program counter (PC) is laid out in the second sector (ST12) of the first pipeline stage (ST1),
   the address selection signal (SEL) is applied to the circuit (SPC) for the incrementation of the program counter during the first clock half-cycle (H1).

2. Microprocessor (FIG. 1, MP1) according to claim 1, in which the means (PREDEC) for decoding the conditional jump instruction (JMPc) are laid out in the first sector (ST11) of the first pipeline stage (ST1), and the address selection signal (SEL) is applied to the circuit (SPC) for the incrementation of the program counter by means of a latch register (B2) separating the two sectors (ST11, ST12) of the first pipeline stage (ST1).

3. Microprocessor (FIG. 2, MP2) according to claim 1, in which the means (DEC3) for decoding the conditional jump instruction are laid out in the second sector (ST12) of the first pipeline stage (ST1), and the address selection signal (SEL) delivered by the means (DEC3) for decoding the conditional jump instruction is applied directly to the circuit (SPC) for the incrementation of the program counter.

4. Microprocessor according to claim 1, in which:
   the conditional jump instruction (JMPc) is a relative jump instruction,
   the means (SPC) of incrementation of the program counter (PC) comprise an adder circuit (ADD) receiving, at input, the current value of the program counter (PC) and the output of a multiplexer circuit (MUX),
   the multiplexer circuit (MUX) is driven by the means (PREDEC, DEC3) for decoding the conditional jump instruction (JMPc) and receives, at input, a normal incrementation value (+1) of the program counter and a relative jump value (VAL) of the program counter (PC), contained in the conditional jump instruction (JMPc).

5. Microprocessor according to claim 1, in which:
   the conditional jump instruction (JMPc) is an absolute jump instruction,
   the means (SPC) of incrementation of the program counter (PC) comprise a multiplexer circuit (MUX) receiving, at input, the output of an adder circuit (ADD) and an absolute jump value (VAL) of the program counter (PC) contained in the conditional jump instruction (JMPc),
   the multiplexer circuit (MUX) is driven by the means (PREDEC, DEC3) for decoding the conditional jump instruction (JMPc), and
   the adder circuit (ADD) receives, at input, the current value of the ordinal counter (PC) and a normal incrementation value (+1) of the program counter.

6. Microprocessor according to claim 1, in which the decoding means (PREDEC, DEC3) are laid out to decode a compact conditional jump instruction (JMPc) comprising an operation code ($CODE_{JMPc}$), a condition (COND) and a jump value (VAL).

7. Microprocessor according to claim 1, comprising a bank of registers (REGBANK) belonging in read mode to the first sector (ST21) and in write mode to the second sector (ST22) of the second pipeline stage (ST2).

8. Microprocessor according to claim 7, in which the sectors (ST21, ST22) of the second pipeline stage (ST2) are demarcated by a tristate buffer (B4) laid out between the first (S1) and second (S2) outputs of the computation unit (ALU) and write inputs (INRd, INRf) of the bank of registers (REGBANK).

* * * * *